United States Patent [19]

Mindel et al.

[11] 4,307,418
[45] Dec. 22, 1981

[54] VIDEO DISC PLAYER SYSTEM FOR CORRELATING STYLUS POSITION WITH INFORMATION PREVIOUSLY DETECTED FROM DISC

[75] Inventors: Michael J. Mindel, Camby; James C. Rustman, Indianapolis, both of Ind.

[73] Assignee: RCA Corporation, New York, N.Y.

[21] Appl. No.: 84,392

[22] Filed: Oct. 12, 1979

[51] Int. Cl.³ .................... H04N 5/76; G11B 17/22; G11B 15/52; G11B 3/82

[52] U.S. Cl. .................... 358/128.5; 369/30; 369/32; 369/33; 369/41; 369/47; 369/53; 360/72.2

[58] Field of Search .................... 358/128.5, 128.6; 360/72.2, 75, 77, 78; 179/100.3 V; 369/30, 32, 33, 41, 47, 53; 365/230, 232, 234, 236

[56] References Cited

U.S. PATENT DOCUMENTS 4,000,510 12/1976 Cheney et al. ............... 360/72.2 X
4,138,741 2/1979 Hedlund et al. ............... 360/77 X
4,190,820 4/1980 Ohtake et al. ............... 358/128.5 X
4,199,820 4/1980 Ohtake et al. ............... 358/128.5 X Primary Examiner—Aristotelis M. Psitos
Attorney, Agent, or Firm—E. M. Whitacre; J. S. Tripoli; E. P. Herrmann

[57] ABSTRACT

A video disc playback system for detecting field number information recorded on a sectored video disc and representing stylus location, and for correlating presently received field number information with previously received field number information. Presently received field number data is correlated to previously received field number data to determine whether or not the presently received data indicates the playback stylus to be playing back from a predicted sector of the disc and within a predicted range of radius from the center of the disc. These range and sector checks are used to reduce the probability of data errors passing undetected during playback.

6 Claims, 11 Drawing Figures

VIDEO DISC PLAYER SYSTEM FOR CORRELATING STYLUS POSITION WITH INFORMATION PREVIOUSLY DETECTED FROM DISC

This invention relates to a video disc player arrangement for correlating current field number data with previous field number data read from video disc.

To implement certain advanced features in a video disc player, it is desirable to record certain digital information along with the video signal. See copending patent applications "TRACK ERROR CORRECTION, AS FOR VIDEO DISC PLAYER" by J. Rustman and M. Mindel, and "IMPROVED DIGITAL ON VIDEO RECORDING AND PLAYBACK SYSTEM" by C. Dieterich and T. Christopher, both field concurrently herewith and assigned to the assignee of the present invention.

In particular, it is desirable to record digital numbers representing, for example, field numbers of the video signal being recorded. These numbers are recorded such that they correspond to physical locations on the disc in a known sequential order. The track error correction system disclosed in the first above-mentioned patent application uses the prerecorded digital information to keep the pickup apparatus on the correct track.

It has been found that it is desirable in track error correction systems to prevent noisy signals from causing unnecessary movement of the pickup device in the player apparatus. The present invention facilitates such improvement in system noise immunity by providing a means for identifying uncorrelated field number data which would otherwise be regarded as valid data.

In the disclosed apparatus, embodying the present invention, after the first valid field number is read, the video disc player which includes a microprocessor-controller establishes a next expected, or predicted, field number. The predicted field number is incremented periodically. When the pickup device, such as a stylus, is skipping to a new information track location and no new field number is available, the microprocessor keeps time and increments the predicted field number accordingly.

When the pickup device encounters a defect in the disc record and skips over a number of convolutions, its range of travel along the radius of the video disc is limited. For example, in systems using a stylus in a driven carriage, as a result of physical limitations of the stylus move and response limitations of the carriage servo system, the maximum possible physical jump of the stylus, taking into account worst case conditions, is observed to be on the order of 63 convolutions of the spiral information track. According to an aspect of the present invention, when a new field number is read, it is compared with the expected field number. If the new field number represents a jump of more than 63 convolutions, i.e. if the difference between the present field number and the expected field number is more than 504 (63 times, for example, 8 fields per spiral convolution), the data concerning present playback stylus position is considered invalid because such a large increment should not normally be possible. This form of data checking is referred to as a range check.

The video disc contains a fixed number of video fields in each convolution of the spiral signal track (for example, 8 fields). The vertical sync pulses, therefore are radially aligned, dividing the disc into eight pie-shaped sectors. Since the relative physical position of the sectors is fixed, as the disc rotates beneath the stylus, the sectors follow a periodic recurring order even if the stylus jumps over a number of convolutions.

Each field number thus contains sector information. For instance, assume that field numbers are consecutively numbered according to a binary code. Then, continuing the above example for eight sectors, the last three bits of each field number corresponds to its sector location. When a new field number is read, the last three bits thereof are compared to the last three bits of the expected field number. If the new sector and expected sector are unequal, the data concerning present playback stylus position is considered invalid. Using the field numbers for sector checking, according to an aspect of the present invention, allows sector checking to be performed using apparatus already in place for track error correction and permits sector checking to be performed without having to expand the amount of digital information recorded along with the video signal.

Field numbers represent actual stylus position on the video disc during playback. Each of the range and sector checks described above, which correlate present field number with a previous field number, are seen to correlate present stylus position with previous stylus position in a way based on the known geometry of the video disc.

In accordance with an aspect of the present invention means are provided in a video disc playback apparatus for counting the number of elapsed video fields between a previously detected video field number and a successively detected video field number and for comparing successively detected field number to the previously detected field number for determining whether or not the previously detected field number plus the number of elapsed video fields correlate to the same sector of the video disc as the successively detected field number.

In accordance with another aspect of the present invention a memory means is provided for storing successive ones of detected field numbers. In addition, a counting means is utilized for counting a prescribed number of elapsed video fields after storing each one of the detected field numbers. The counting means includes a means for generating a predicted field number which is equal to the previously stored field number plus the prescribed number of elapsed video fields. A comparator means is then used to compare a successively detected field number to the predicted field number to determine if the detected field has the same remainder, after the detected field number is divided by a fixed number (which equals the number of video fields recorded on the disc per spiral convolution), as the remainder of the predicted field number when the predicted field number is divided by the fixed number.

In accordance with yet another aspect of the present invention means are provided in a video disc playback apparatus for counting the number of elapsed video fields between a previously detected video field number and a successively detected video field number and for comparing said successively detected field number to said previously detected field number for determining whether or not said previously detected field number plus said number of elapsed video fields is within a predetermined acceptable range of said successively detected field number.

IN THE DRAWING

SIGNAL FORMAT

Figure 1:
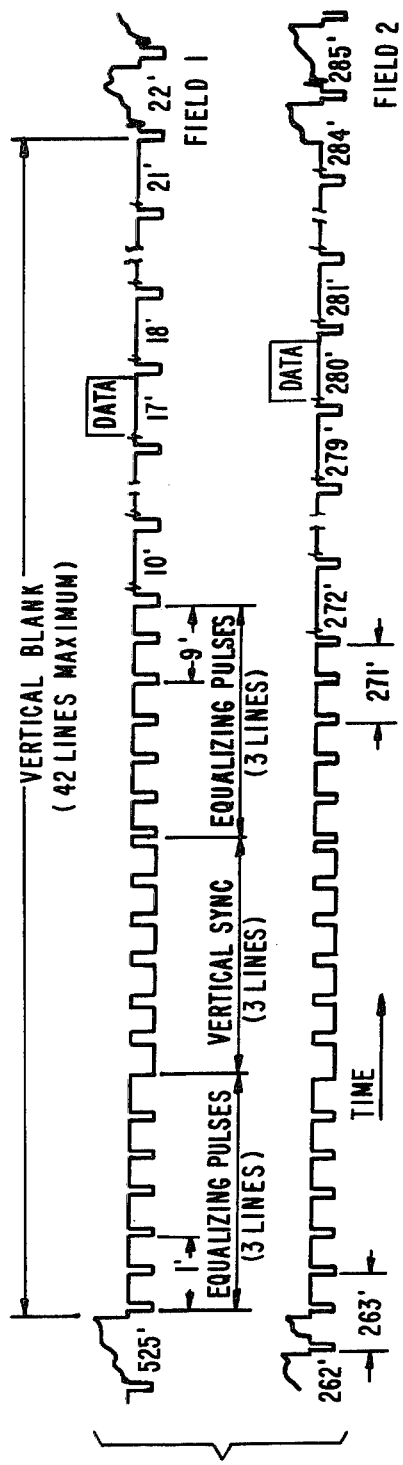
FIG. 1 is a graphical representation of a television signal including the vertical blanking interval between odd and even fields.

Particular details of an NTSC type television signal formatted in accordance with the buried subcarrier technique as described in U.S. Pat. No. 3,872,498, "Color information translating systems", to D. Pritchard, are shown in FIG. 1. A vertical blanking interval separates the interlaced odd and even fields. Those skilled in the television arts will readily recognize the standard vertical blanking interval containing a first equalizing pulse interval, a vertical sync interval, a second equalizing pulse interval, followed by a number of horizontal line intervals at the start of each new field. As shown in FIG. 1, the video signal information begins on line 22' of field 1, and on line 284' of field 2.

The digital information representative of the field number appears at line 17' of field 1, and line 280' of field 2. Digital information could, as well, be inserted in other lines of the vertical blanking interval. To show the details of the digital signal format, FIG. 2 expands the time scale during the horizontal line containing data (line 17' or line 280').

Figure 2:
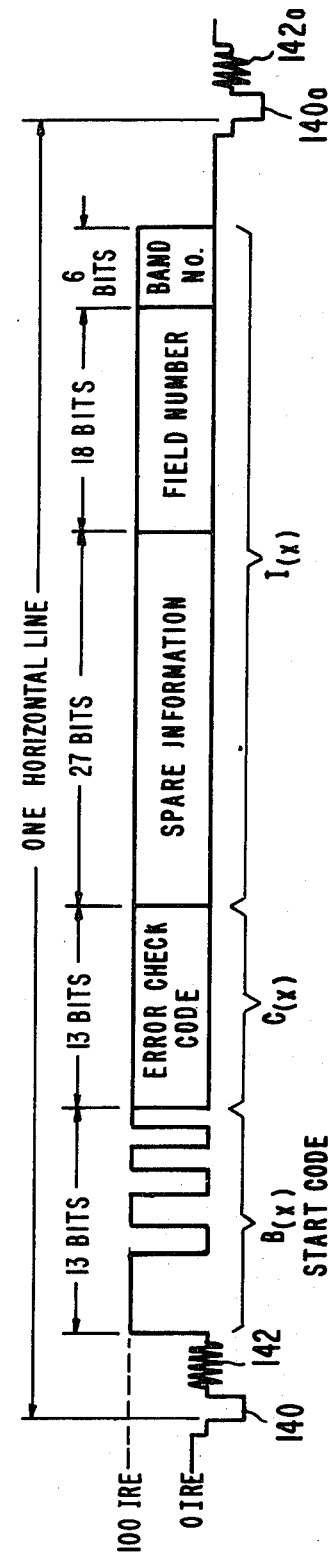
FIG. 2 is a graphical representation of the digital data format used in the recording method of the present invention.

Data are represented in terms of luminance level: 100 IRE units is a logical "one" and 0 IRE units (blank) is a logical "zero". The first data bit follows the standard horizontal sync pulse 140 and color burst 142. The frequency of the burst 142 is about 1.53 MHz, the frequency of the buried subcarrier. Each data bit is transmitted synchronously with the 1.53 MHz buried subcarrier signal. As shown in FIG. 2, the digital message comprises a 13-bit start code termed B(x), a 13-bit redundant error check code termed C(x), and 51 information bits termed I(x). The beginning of the next horizontal line is indicated by the next horizontal sync pulse 140a and color burst 142a. Thus, the individual data bits are synchronous with the color subcarrier, and the overall digital message is synchronous with the vertical sync pulse. Note that the data rate can be a multiple or submultiple of any convenient subcarrier frequency. Also, other values of luminance may be assigned to logic one and zero, or more than one bit may be associated with a given luminance level.

A start code is used in the present system to synchronize the data system to the digital message thereby avoiding the need to detect the edge of horizontal or vertical sync. Synchronizing errors in a serial digital data system result in framing errors, i.e. where received data is shifted by one or more bits from its proper position. Previously known systems for recording digital data on a video disc encoded signal have shown that the edges of sync signals are not reliable as a time reference and have resulted in framing errors. Start codes have proven to be more reliable.

The specific start code chosen, 1111100110101, is one of the Barker codes known in radar and sonar technology. See "Group Synchronization of Binary Digital Systems", by R. H. Barker, published 1953 by Academic Press, New York, N.Y. Barker codes are designed such that the auto-correlation function, of a signal containing a Barker code shifted with respect to itself, is maximized when coincidence occurs, and minimized elsewhere. That is, if one assigns a value of +1 or −1 to each bit in the start code and computes the sum of the respective bit products for each shifted position of the start code with respect to itself, such auto-correlation function will produce a sharp maximum when coincidence occurs. Specifically, a Barker code shifted any odd number of places with respect to itself produces an auto-correlation of 0. A Barker code shifted any even number of places with respect to itself produces an auto-correlation of −1. However, when there is coincidence, the auto-correlation is N, where N is the number of bits in the Barker code. In other words, a Barker code shifted any number of places with respect to itself differs in a maximum number of bit positions. In the presence of noise, this characteristic reduces the probability of a false start code detection, as compared to an arbitrarily chosen start code.

The information bits, I(x), include a field number, a band number, and spare information bits for future expansion. Field numbers identify each field of the video signal by a unique 18-bit binary number. At the beginning of the video disc, the first field of the video program is field "zero". Thereafter, each field is consecutively numbered in ascending order. Band numbers refer to recorded video signal in a group of adjacent convolutions of the spiral grooves which form a band-like shape. All of the material in such band of grooves is identified by having a common band number. As an example of band number utility, the video signal after the end of the video program material is recorded having band number "sixty-three". The video disc player senses band sixty-three as the end of program and responds by lifting the stylus from the record.

The error check code C(x) is computed from I(x) in the video disc recording apparatus. To this end, I(x) is multiplied by a constant, H(x). The resulting product is divided by another constant g(x). After such division, the remainder (the quotient is unused) is added to a third constant M(x). The result is C(x).

In the video disc player, the received message is checked for errors by dividing the entire message, including the start code, by the constant g(x) mentioned above. If the remainder is equal to the start code, B(x), then the message is considered error free. The constants H(x) and M(x) are chosen so that the remainder of the entire message will in fact be the start code. The constant g(x), used in both the video disc recording apparatus and the video disc player is called the generator polynomial of the code. A specific g(x) is chosen which generates a code having error detection properties particularly advantageous as applied to the video disc medium. In the system described herein, the addition, multiplication, and division operations referred to above are performed according to special rules to accommodate the hardware available for carrying them out. The error coding will be discussed in greater detail hereinafter in conjunction with the encoding and decoding hardware.

Figure 3:
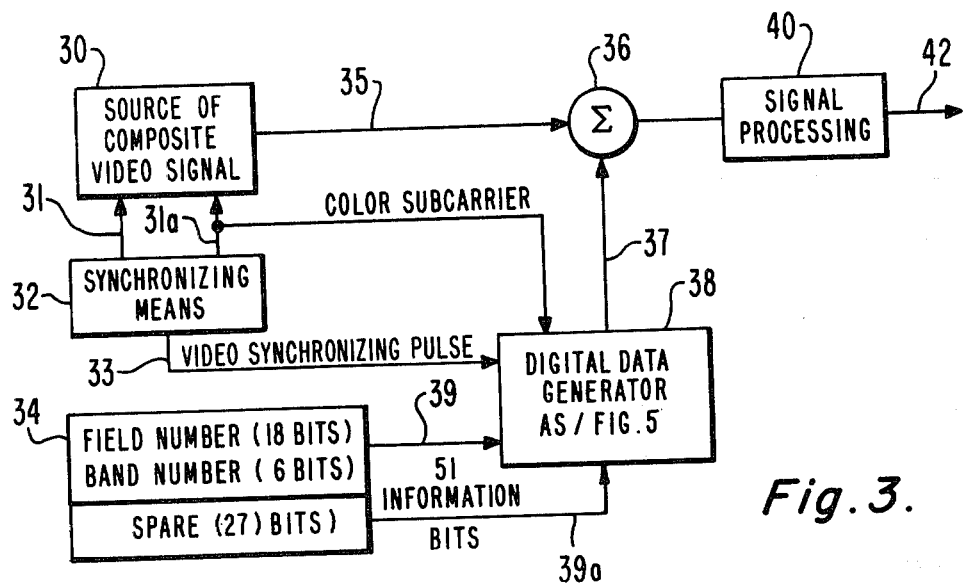
FIG. 3 is a block diagram of a video disc encoder in accordance with the present invention.
Figure 10:
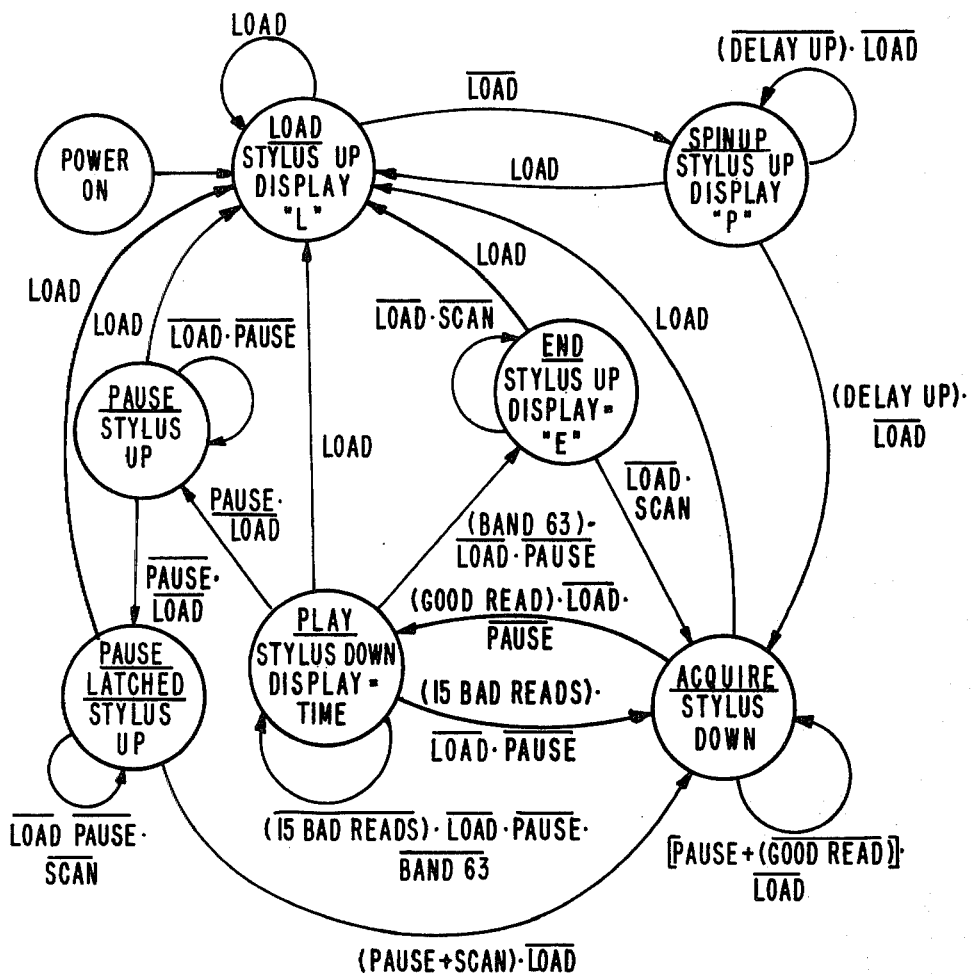
FIG. 10 is a state transition diagram for the microprocessor control means of FIG. 4.
Figure 11:
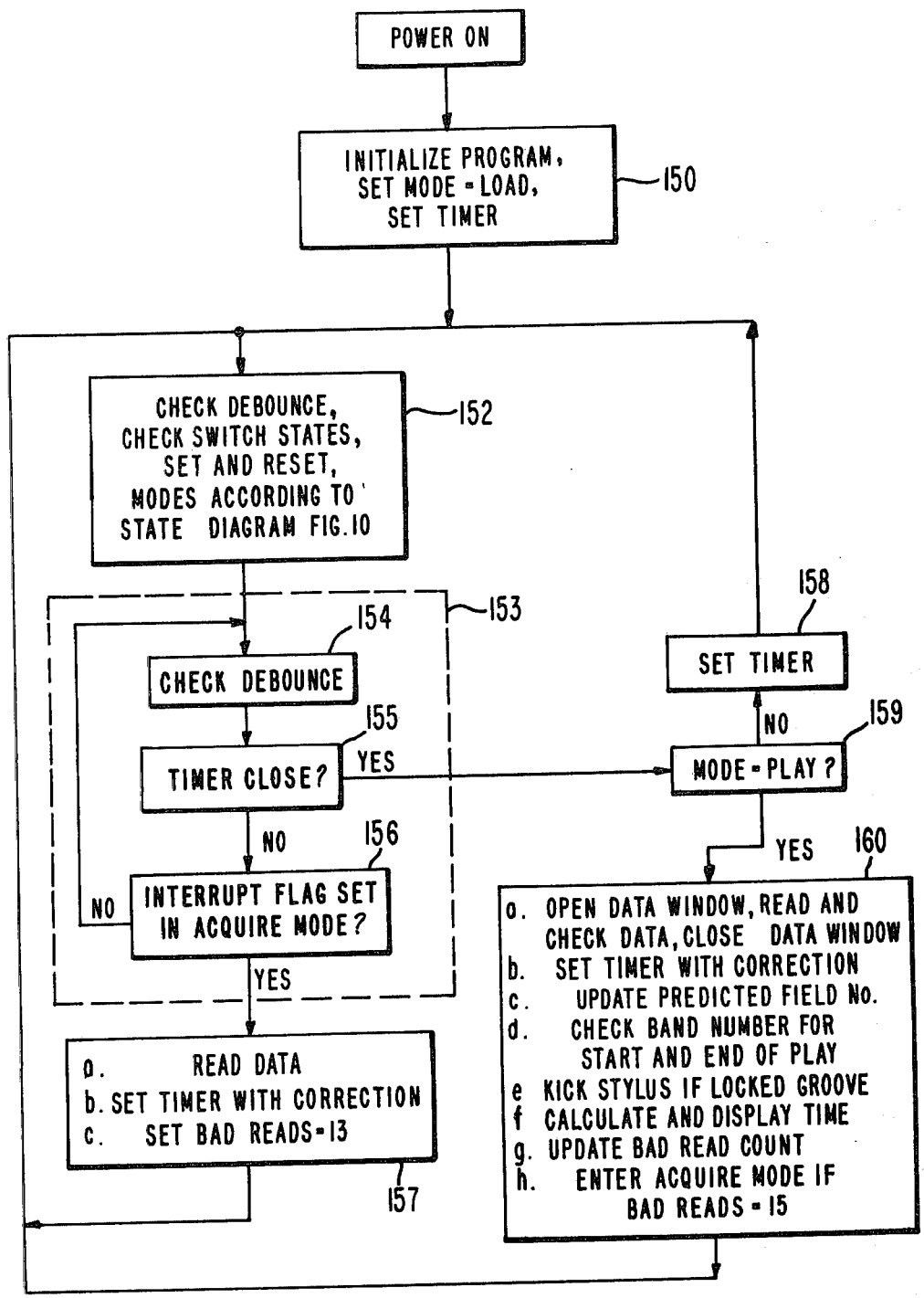
FIG. 11 is a flow chart representing a program algorithm for the microprocessor control means of FIG. 4.

A block diagram of a video disc encoder is shown in FIG. 3. A composite video signal from source 30 is linearly combined in adder 36 with a digital data bit stream on conductor 37 supplied by the digital data generator 38. Synchronizing means 32 supplies a color subcarrier and synchronizing pulses so that the data bits generated by the digital data generator 38 are synchronous with the color subcarrier appearing at terminal 31a and so that the digital message is encoded on the proper horizontal line in the vertical blanking interval. Information bits, appearing at data bus 39 and representing the video field number and band number, are provided by apparatus 34. The use of field number and band number information will be discussed in conjunction with the microprocessor program (FIGS. 10 and 11). The digital data and the video signal are combined in the adder 36. Further signal processing means 40 conditions the composite video for the recording medium. The composite video signal is of the buried subcarrier type and is recorded using FM modulation techniques.

Figure 4:
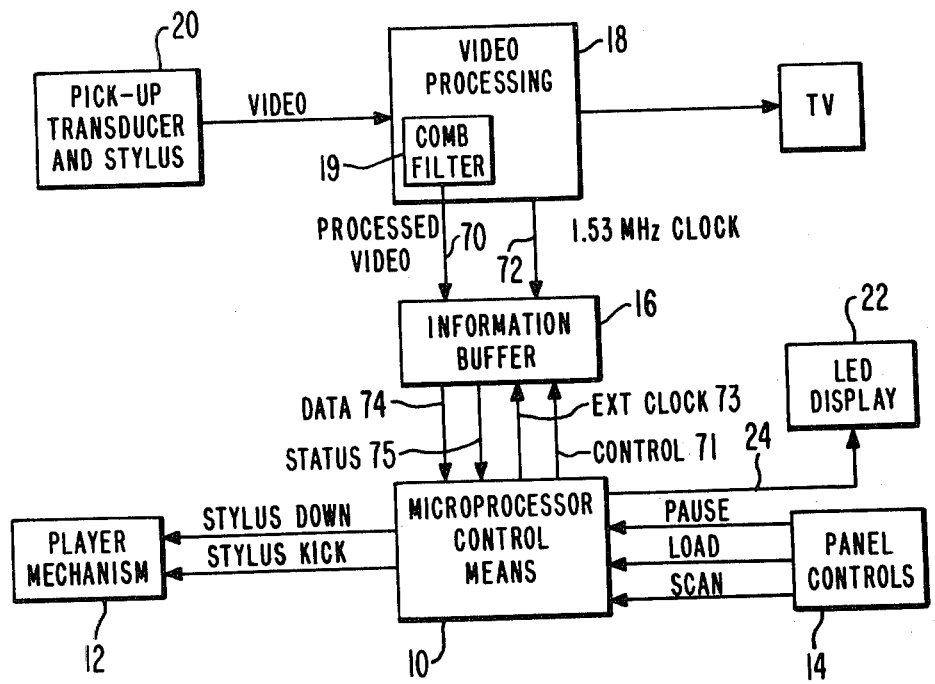
FIG. 4 is a block diagram of a video disc player embodying the present invention.

In the video disc player of FIG. 4, the FM signal is detected using pickup transducer and stylus assembly 20 and converted in video processing circuitry 18 to a standard television signal for viewing on an ordinary television receiver. Video processing circuitry 18 includes means responsive to the color burst signal to phase lock a 1.53 MHz local color oscillator to the color subcarrier. The color oscillator, in addition to its usual use for demodulating the buried subcarrier wave, is also used to provide the digital clock and this signal appears on conductor 72. The video processing circuitry 18 further includes means for demodulating the video carrier and comb filtering the recovered video signal. Comb filter 19 subtracts two adjacent field lines, which result appears on conductor 70 as processed video. Since line 16', which is at the black level, is subtracted from line 17', which is modulated with digital data, the processed video on conductor 70 is the recovered digital data. Naturally, line 16' may be any constant luminance level. Note that if the subsequent line 18' to the data line 17' is a constant luminance line (also black) the subsequent output of the comb filter during line 18' is again recovered digital area, but the data is inverted. By subtracting one line from a constant luminance adjacent line, the recovered digital signal is self-referenced, thereby eliminating data errors due to shifts in the d-c level of the video signal. If it were desired to place data on consecutive lines, as compared to placing data adjacent to constant luminance lines, then means for referencing the video signal to a predetermined luminance level, or a d-c reference level would be necessary in order to separate the digital data stream from the video signal.

As shown in FIG. 4, the information buffer 16 is responsive to processed video on conductor 70 and the 1.53 MHz clock signal on conductor 72 to extract digital data from the video signal. The buffer 16 is controlled by a digital binary control signal on conductor 71 from the microprocessor 10. In one binary state, the control signal on conductor 71 causes the information buffer 16 to acquire data. In the other binary state, the control signal on conductor 71 conditions the information buffer 16 to transfer the received data to the microprocessor 10. In particular, when the control signal on conductor 71 is high, the information buffer 16 opens to sample incoming data on the processed video signal conductor 70 using the 1.53 MHz signal on conductor 72 as a clock. After a complete message is received, the status signal on conductor 75 furnishes an indication that a message is complete. To transfer the message to the microprocessor memory, the control signal on conductor 71 is set low. This action closes the information buffer 16, resets the internal control circuits, and gates the results of the message error code check onto status conductor 75. If the status signal indicates the message is valid (i.e. error code check indicates validity), the microprocessor 10 is programmed to transfer the data in the information buffer 16 to the microprocessor 10. The microprocessor supplies an external clock signal on conductor 73 to transfer data from the information buffer 16. For each clock pulse, one bit of data on conductor 74 is shifted out of the information buffer and into the microprocessor 10. When all the data is transferred to the microprocessor 10, and the program is ready for another digital message, control conductor 71 is again returned to a high state and the process is repeated.

The microprocessor 10, via the information buffer 16, controls the gating of line 17' (or line 280') out of the video signal. The first digital message is obtained by continuously searching the video signal for a start code. Thereafter, the information buffer 16 is closed. Then, based on the time of arrival of the first digital message, the information buffer is opened approximately six lines before the next digital message is expected. If no valid message is found, the information buffer 16 is closed approximately six lines after such expected time of arrival. If a valid digital message is found, the information buffer 16 is closed and a new time of arrival for the next digital message is calculated based on the time of arrival of the current digital message. In such manner, the microprocessor 10 opens a gate, or "data window", approximately twelve lines wide and centered about the expected data. The time interval from the center of one data window to the next is approximately one video field time interval. The width of the data window is chosen so that under worst case timing conditions the expected data will fall within the data window. Sources of timing error, as explained below, are: finite resolution of the digital timer; the drift rate of the timer; program uncertainty in determining time of arrival of present data; and timing differences between odd and even interlaced fields. Use of an alternate microprocessor and/or timer may be accommodated by adjusting the data window width accordingly. The microprocessor program which controls the logic for searching for data and centering the data window is discussed hereinafter in conjunction with FIGS. 10 and 11.

The microprocessor 10 is also responsive to the player panels control 14 (load, pause, and scan) to operate the player mechanism 12 and drive the player display 22 in accordance with a predetermined program, as discussed hereinafter. The player mechanism is further provided with at least one stylus "kicker" operable by the microprocessor 10. A kicker is a means, piezoelectric, electromagnetic, or otherwise, for impulsively moving the signal pickup means to adjacent grooves or signal tracks on the video disc medium. The use of the kicker to break out of locked grooves will be discussed hereinafter in conjunction with the flow diagrams of FIGS. 10 and 11. The microprocessor control means illustrated in FIG. 4 may be a self-contained digital microprocessor including all the associative requisite circuitry within its structure, e.g., programming memory, random access memory and input/output ports for accepting data and outputting information and control signals respectively. On the other hand, the microprocessor control means may be a system of discrete subsystems including, but not limited to, memory devices for storing data or products or arithmetic operations, etc., arithmetic circuits for performing arithmetic functions such as subtraction or division, and a microprocessor which marshalls the system data and coordinates the functioning of the various devices to perform the desired results.

ERROR CODE

As mentioned above, the video disc recording apparatus uses the information bits $I(x)$ to compute $C(x)$. Because of the large number of potential combinations—$I(x)$ and $C(x)$ together are 64 bits long—and the desire to determine the error detection and correction characteristics of a given code without resorting to enumeration, error codes are treated mathematically. A general mathematical development of ring theory and Galois Fields $GF(2^m)$, applicable to error codes in general, can be found in "Error Correcting Codes" by W. Wesley Peterson, published by MIT Press, Cambridge, Mass. For present purposes, the error coding in the video disc may be best understood in terms of a few simple definitions.

A digital message, comprising ones and zeros, can be considered as representing an algebraic polynomial comprising powers of x. The coefficients of the respective powers of x are the individual bits of the message. For example, the 4 bit message 1011, can be represented by the polynominal $P(x)$, where $$P(x) = 1 \cdot x^3 + 0 \cdot x^2 + 1 \cdot x + 1 \cdot x^0$$
$$= x^3 + x + 1$$

Applying this notation to the start code, 1111100110101, then
$$B(x) = x^{12} + x^{11} + x^{10} + x^9 + x^8 + x^5 + x^4 + x^2 + 1$$

The highest power of x is called the degree of polynomial. In the above example, $B(x)$ is a polynomial of degree 12.

Polynomials may be added, subtracted, multiplied, and divided using the ordinary rules of algebra except for expressing coeficients in modulo 2 terms. A shorthand notation for the remainder of a polynomial after division by another polynomial is indicated by brackets. That is, if $$P(x)/g(x) = Q(x) + r(x)/g(x)$$

where the remainder, $r(x)$, has a degree less than the divisor, $g(x)$, then $$[P(x)] = r(x)$$

In the video disc recording apparatus, the total message recorded on the video disc is represented by a polynomial, $T(x)$. From FIG. 2, $$T(x) = B(x)x^{64} + C(x)x^{51} + I(x) \qquad (1)$$

The term $x^{64}$ shifts $B(x)$ by 64 bits, because $B(x)$ is at the beginning of the data format. Similarly, the term $x^{51}$ shifts $C(x)$ 51 bits to represent that $C(x)$ is recorded before $I(x)$. In accordance with the apparatus being described, the recording apparatus computes a value for $C(x)$ so that the total message, $T(x)$, has a remainder equal to $B(x)$ after being divided by $g(x)$. That is, assuming $C(x)$ to be of the form $$C(x) = [I(x) \cdot H(x)] + M(x), \qquad (2)$$

then $H(x)$ and $M(x)$ are constant polynomials chosen so that $$[T(x)] = B(x) \qquad (3)$$

It can be shown that equations (1), (2), and (3), when solved for the constant polynomials $H(x)$ and $M(x)$, yield $$H(x) = [x^{127}]$$

$$M(x) = [B(x)x^{13} + B(x)x^{127}]$$

Figure 7:
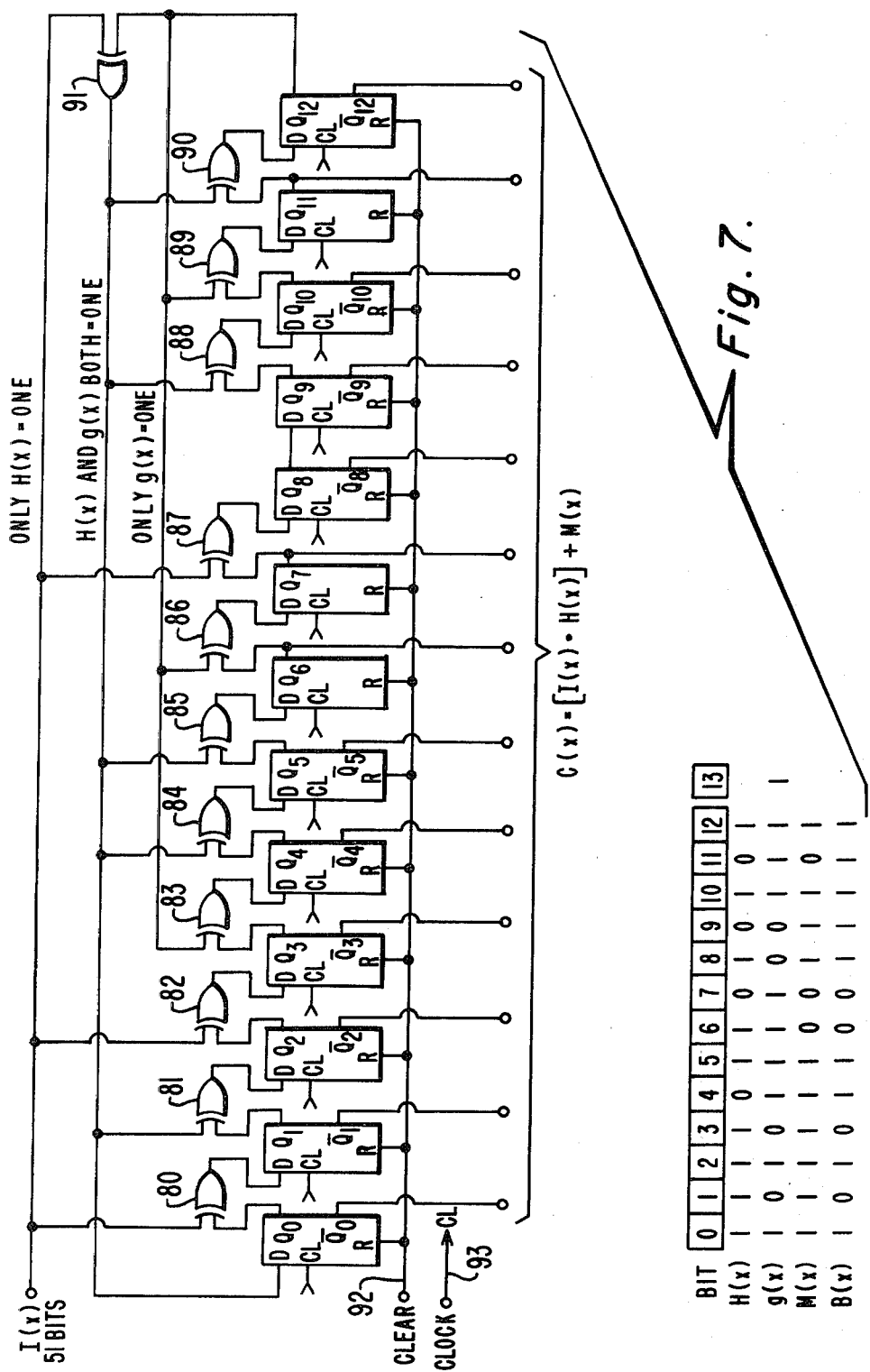
FIG. 7 is a schematic diagram of a means for generating an error check code from the information bits for the video disc encoder of FIG. 5.

FIG. 7 includes a table enumerating the chosen values for $B(x)$ and $g(x)$, as well as the derived values for $H(x)$ and $M(x)$. Note that the table in FIG. 7 shows high order bits on the right, so that they are in the same order as the flip flop storage elements appear in the logic diagram of the same figure.

In the video disc player, the recorded digital message is read by the player electronics. The data recorded on the video disc is $T(x)$. The data read by the player is $R(x)$. If no errors are generated between recording and playback then $T(x) = R(x)$. The received message, $R(x)$, is checked for errors by dividing $R(x)$ by $g(x)$. If the remainder is equal to $B(x)$, the start code, then the message is considered error-free. On the other hand, if the remainder does not equal $B(x)$, then an error is thereby indicated.

The characteristics of a code generated in the above manner depend on the choice of $g(x)$, which is called the generator polynomial. The particular $g(x)$ chosen for the video disc medium is one from the computer generated codes demonstrated by Tadao Kasami in "Optimum Shortened Cyclic Codes for Burst Error Correction" published in IEEE Transactions on Information Theory 1963. A burst error in a digital system is a type of error where adjacent bits in the digital message are lost. Burst errors are considered a likely type of transmission error in the video disc medium. As shown by Kasami in the aforementioned reference, a code which can correct single burst errors of 6 bits or less, can be implemented using a generator polynomial given by $$g(x) = x^{13} + x^{12} + x^{11} + x^{10} + x^7 + x^6 + x^5 + x^4 + x^2 + 1$$

Furthermore, it may be shown that for the $g(x)$ given above, all single burst errors of 13 bits or less will be detected, and 99.988 percent of all single burst errors longer than 13 bits will be detected as well. The video disc player, as described herein, uses only the error detection capabilities of the chosen code.

As a specific example of error code generation, consider the case where the field number is 25,000, the band number is 17, and the spare bits are 0. Since 25,000 in binary representation is 000 110 000 110 101 000, and 17 in binary representation is 010 001 (high order bits are on the left), the 51 information bits are 000 000 000 000 000 000 000 000 000 000 110 000 110 101 000 010 001. The order of transmission is spare bits first, followed by field number, and then band number, wherein the most significant bit is transmitted first. The error code for the above specific I(x), computed as the remainder of I(x) times H(x), plus M(x), is represented by 0111100100010. The next video field is 25,001 or 000 110 000 110 101 001 in binary representation. For the corresponding information bis, 000 000 000 000 000 000 000 000 000 000 110 000 110 101 001 010 001, the proper error code is 1000101101110. The complete digital message for field 25,001 including the start code is therefore, 1111100110101 1000101101110 000 000 000 000 000 000 000 000 000 110 000 110 101 001, 010 001, shown in order of transmission. The start code is the first 13 bits, the error code is the next 13 bits, and the 51 information bits are last. In the video disc player, the above digital message is checked for errors by dividing the received message by g(x). If no errors are detected, the remainder is 1111100110101, which is exactly the start code.

HARDWARE

Figure 5:
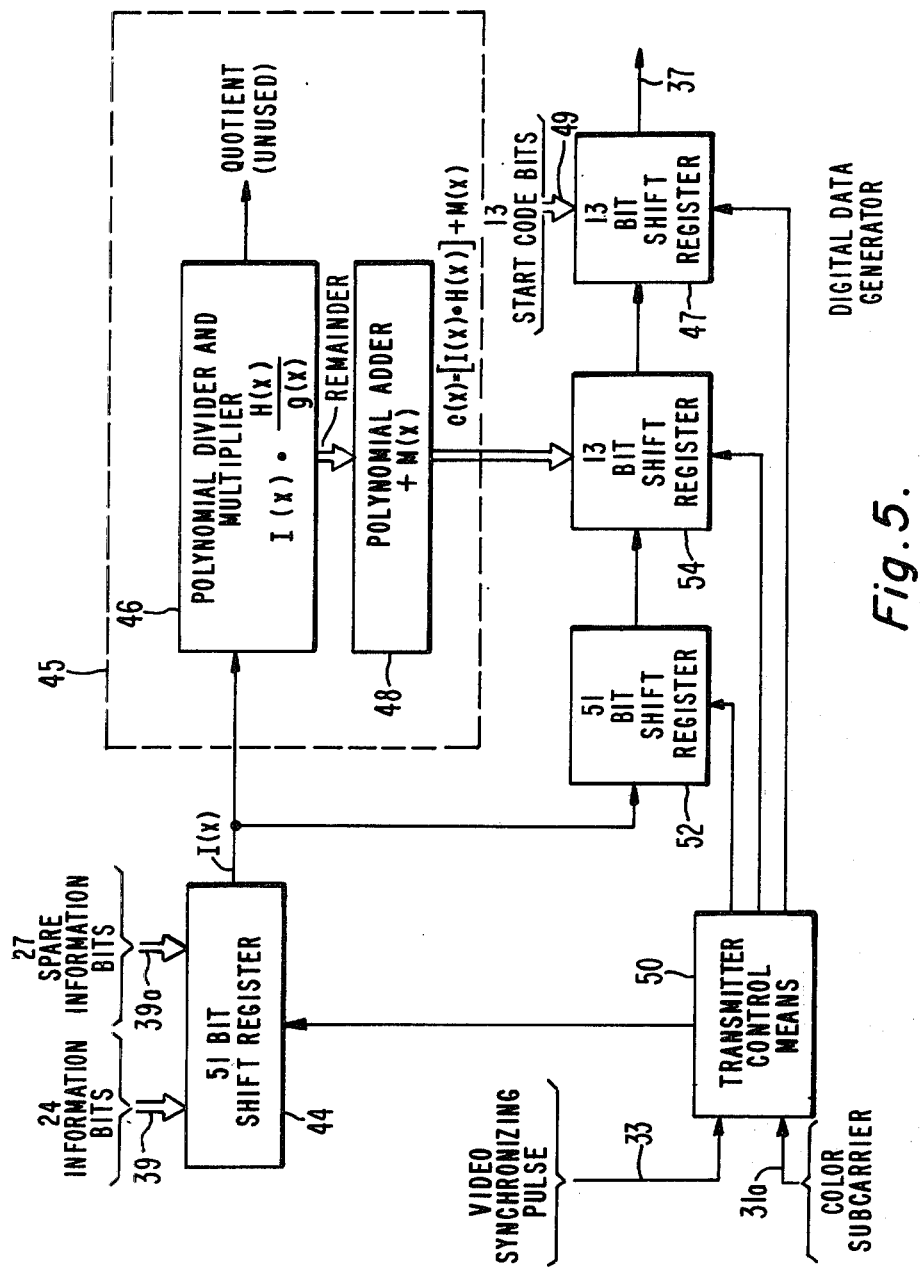
FIG. 5 is a block diagram showing more detail of the digital data generator of the video disc encoder of FIG. 3.

A block diagram of a means for generating T(x) is shown in FIG. 5. Under the control of the transmitter control means 50, 24 information bits are loaded via data bus 39, and 27 spare information bits are loaded via data bus 39a into a 51 bit shift register 44. I(x), which comprises these 51 bits, is then shifted into another 51 bit shift register 52.

At the same time, during the 51 shift pulses, an encoder 45 computes C(x) in the following way. Polynomial dividing and multiplying means 46 is responsive to the 51 bit serial transmission of I(x) to compute the remainder of I(x) times H(x) divided by g(x). M(x) is then added in parallel in polynomial adder 48. The resulting code C(x) is loaded into a 13-bit shift register 54, and B(x), the start code, is loaded via data bus 49 into another 13 bit shift register 47. Since the start code is a constant digital value, such loading is preferably accomplished by fixed connections to the parallel load inputs of shift register 47 as opposed to a software implementation. In positive logic notation, the corresponding parallel inputs to shift register 47 are connected to ground potential wherever the start code has a zero, and to a positive potential wherever the start code has a one. Transmitter control means 50 controls the total message T(x), contained in the three shift registers 52, 54, 47, being shifted out serially in synchronism with the color subcarrier on conductor 31a. A video synchronizing pulse applied on conductor 33 provides transmitter control means 50 with a time reference so that the digital message is transmitted at the proper time with respect to the video signal.

A specific embodiment of the encoder (45 of FIG. 5) is shown in FIG. 7. Clocked flip flops having output terminals $Q_0$ through $Q_{12}$ form a remainder register. Multiplication by H(x) and division by g(x) is performed simultaneously in bit serial fashion. Afterwards, the remainder is held in the remainder register outputs $Q_0$ through $Q_{12}$. See Chapter 7, pages 107–114 of the above-mentioned Peterson reference for a general treatment of such circuits. To appreciate the simplicity of the circuit in FIG. 7 for multiplying and dividing polynomials, it is noted that both addition and subtraction (of coefficients of terms of like power) is performed by an exclusive OR gate. Multiplication of I(x) by H(x) is performed by appropriate connections to one or more exclusive OR gates 80 through 91. In particular, wherever a coefficient of H(x), but not g(x), is equal to 1, (bit positions 1, 3, and 8) input I(x) is connected to an input of an exclusive OR gate 80, 82, and 87, respectively. Division of I(x) by g(x) is performed by multiplying the output of $Q_{12}$ by g(x), and subtracting the resulting product from the contents of register $Q_0$ through $Q_{12}$. In particular, wherever a coefficient of g(x), but not H(x), is equal to 1, (bit positions 4, 7 and 11) the output of $Q_{12}$ is connected to an input of exclusive OR gate 83, 86, and 89, respectively. Where H(x) and g(x) are both equal to 1 (bit positions 0, 2, 5, 6, 10 and 12) the output of exclusive OR gate 91 is connected to an input of exclusive OR gates 81, 84, 85, 88, and 90, respectively. After 51 clock pulses, one for each bit of I(x), the contents of register $Q_0$ through $Q_{12}$ is the remainder of I(x)·H(x) after division by g(x).

Note how M(x) is added to the contents of the remainder register. Addition of coefficients is in modulo 2 arithmetic performed as the exclusive OR function. Wherever M(x) has coefficients of +1, the complement output, $\overline{Q}$, of the corresponding flip flop is used; wherever M(x) has coefficients of 0, the uncomplemented output, Q, is used.

Figure 6:
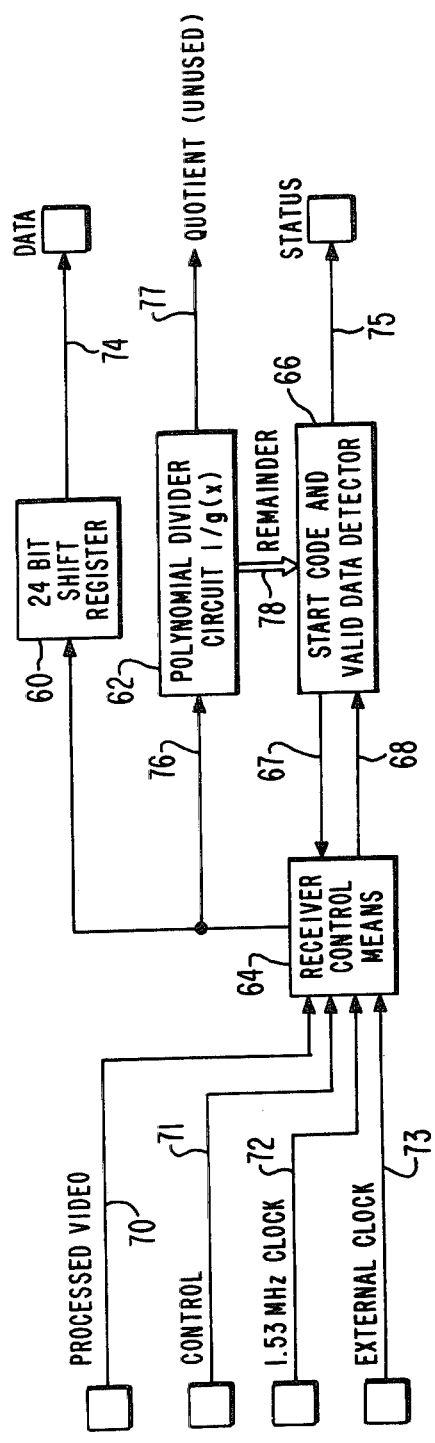
FIG. 6 is a block diagram showing more detail of the information buffer for the video disc player of FIG. 4.

A block diagram of a means for decoding the received message, R(x), appears in FIG. 6, which is an embodiment of the information buffer 16 of FIG. 4, discussed above. Control signal on conductor 71, an input, conditions the receiver decoder of FIG. 6 either to receive data from the video signal, or transfer data to the microprocessor.

In the receive state, each bit is simultaneously shifted into two separate registers. One such register 60 is for data, and the other 62 is for error checking. The error check register 62 is a polynomial divider. However, when acquiring new data, the divider feedback path is disabled so it functions as a straight shift register. The operation of divider register 62 will be discussed subsequently in greater detail in conjunction with FIG. 8. For present purposes, register 62 is responsive to the receiver control means 64 to either shift in successive bits of R(x), or divide successive bits of R(x) by g(x). In either case, the contents of register 62 is available on data bus 78 and provided to the start code and valid data detector 66.

The receive operation begins with register 62 conditioned to operate as a shift register. After B(x) is detected by detector 66, control means 64 conditions register 62 to operate as a polynomial divider. Thus, polynomial division by g(x) begins with B(x) in the divider register 62. The receiver control means 64 is further responsive to the detection of B(x) to time out a period equal to the remaining message bits (64 clock pulses). After the time out period, the divider 62 contains the remainder of R(x) modulo g(x), which should be B(x) if the message is valid. During the error check process, data register 60 has been shifting the data bits. At the end of the time out period, the data register 60 stores only the last 24 bits. However, since the 24 information bits are placed at the end of the message, register 60 will contain the assigned information bits. If it is desired to utilize the spare information bits, additional shift register stages may be added.

Interpretation of the output status signal on conductor 75 depends on the state of control signal on conductor 71. When the control signal on conductor 71 conditions the receiver for acquiring data (receive state) the status signal on conductor 75 is defined as "message received". When the control signal on conductor 71 conditions the receiver for transferring data (transfer state), status signal conductor 75 indicates "data valid". The control signal on conductor 71 also resets the receiver control means 64 and gates the results of the remainder check onto the status signal on conductor 75.

The received information is transferred out of shift register 60 in response to external clocks supplied by the microprocessor on conductor 73. After the data is shifted out, the control signal on conductor 71 may be returned to its previous state which will again condition the receiver-decoder to continuously search for another start code.

Figure 9:
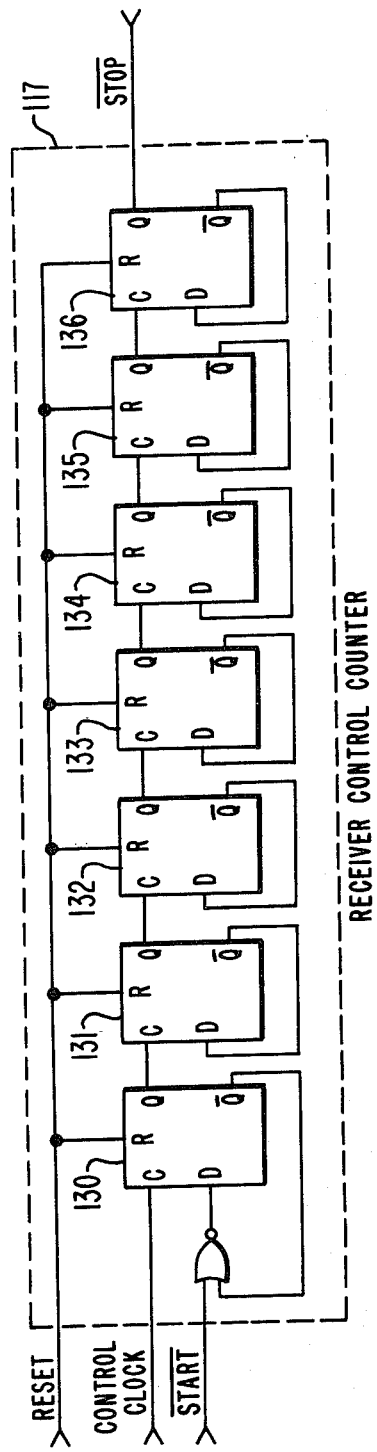
FIG. 9 is an embodiment of a receiver control counter for the information buffer shown in FIG. 8.
Figure 8:
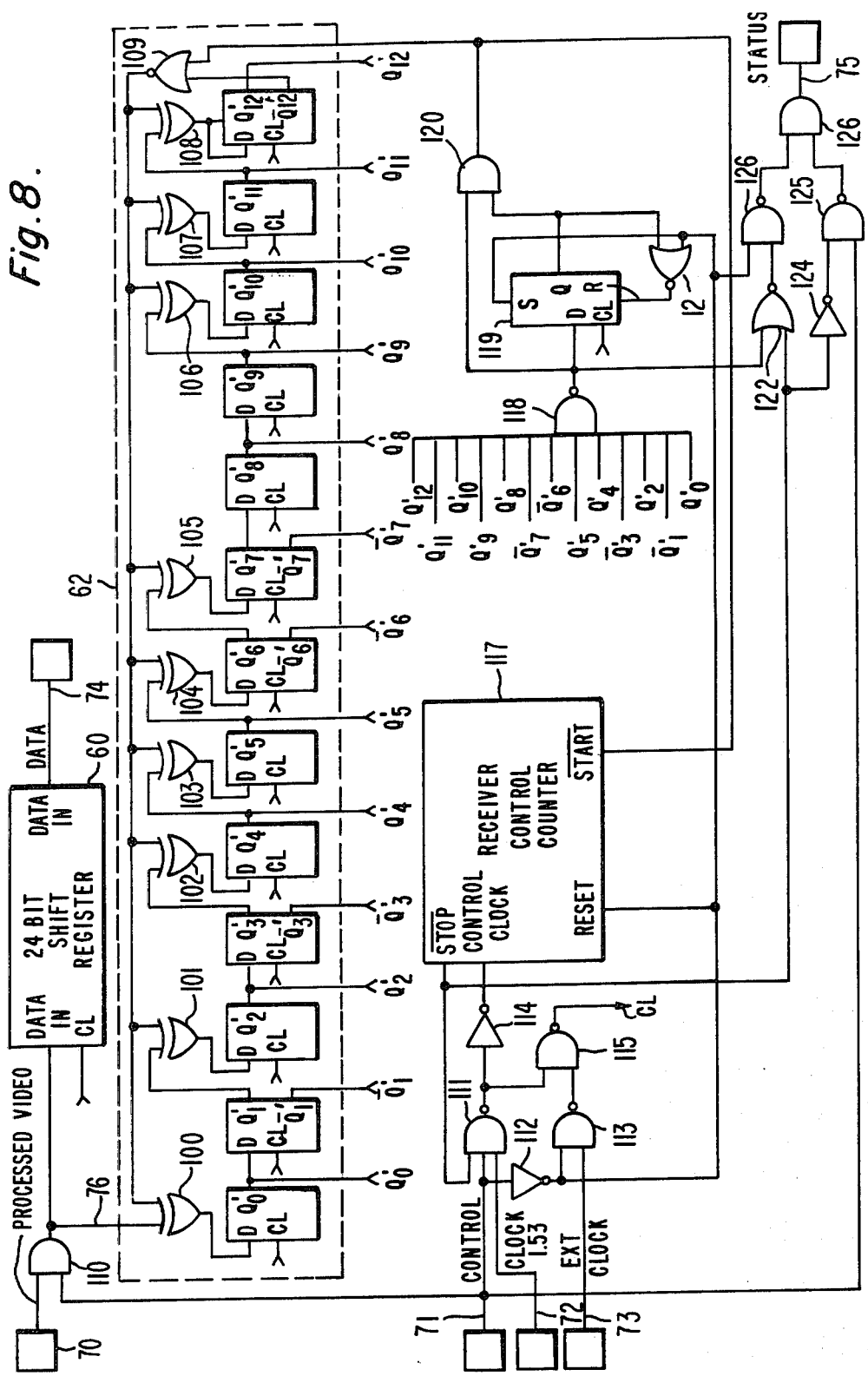
FIG. 8 is a schematic diagram, shown partially in block form, of the information buffer for the video disc player of FIG. 4.

FIG. 8 shows a logic diagram, partially in block form, of the receiver decoder of FIG. 6. The flip flops having output terminals $Q_0'$ through $Q_{12}'$ form a remainder register. Polynomial division by $g(x)$ is performed by multiplying successive register output terms from $Q_{12}'$ by $g(x)$ and subtracting the product (via exclusive OR gates 100 through 108) from the contents of the remainder register. A feedback connector from $Q_{12}'$ (through NOR gate 109) is made to an exclusive OR gate wherever $g(x)$ has coefficients of 1, except for bit 13. Since the coefficients of $g(x)$ are 1 for bit positions 0, 2, 4, 5, 6, 7, 10, 11, 12, an exclusive OR gate is placed at the data input of each respective flip flop of the remainder register as shown. NAND gate 118 detects $B(x)$, which is both the start code and the valid error check code. The receiver control counter 117, begins counting responsive to a start signal from AND gate 120, counts 63 clock periods and supplies a stop signal which is used by NAND gate 111 to stop the clock to all decoder flip flops. A representative embodiment of the receiver control counter 117 is shown in FIG. 9 comprising seven flip flops 130 through 136.

The sequence of operations in receiving data is as follows. When the control signal on conductor 71 is high, data is gated to divider 62 through AND gate 110. Flip flop 119 has been previously set, which disables the feedback signals in divider 62 by blocking NOR gate 109. Register 62 now functions as a shift register. Upon detecting $B(x)$, the output of NAND gate 118 goes low, and the Q output of flip flop 119 goes low one clock period later. Therefore, feedback is enabled for polynomial division by the output of AND gate 120 via NOR gate 109 when $B(x)$ is detected in the remainder register. After 63 clock periods, the receiver control counter 117 stops and the status signal on conductor 75 goes high, indicating "message received". Shift register 60 holds the last 24 bits of $I(x)$. To transfer data, the control signal on conductor 71 is made low. The inverted output of NAND gate 118, which is low if the remainder after division is $B(x)$, is gated onto the status signal on conductor 75. External clock pulses on conductor 73 cause successive shifts of data in register 60 to the output data signal on conductor 74. The external clock pulses also clear the remainder register by shifting in zeros.

The preferred embodiment, above, shows a remainder register beginning and ending with the same non-zero constant. However, it will be understood that other arrangements are possible when using a coset code. For instance, after detecting $B(x)$, the remainder register can be set to a first arbitrary constant. Then, after division, the remainder register is checked for a proper second constant. The first constant, or the second constant, may be zero; both constants may not be zero.

Observe the simplified hardware which results from the error code format described herein. By ending with the start code, $B(x)$, as a valid remainder, the start code detector (NAND gate 118) also serves as a valid code detector. By beginning division with the start code in the divider, a control step is eliminated in not having to clear the remainder register.

Typically, error codes are placed at the end of a message. In accordance with the present invention, by placing the error code before the information bits, the receiver controller is further simplified in not having to distinguish information bits from error code bits with regard to the data storage register 60. In addition, the receiver controller, as shown in FIG. 8, is a simple counter 117, having a start terminal, a stop terminal, and providing a timing out for a single time interval.

MICROPROCESSOR IMPLEMENTATION

Digital information, including band number and field number, are recorded on the video signal, and utilized by the player to achieve a variety of features. Band number information is used by the player to detect end of play (band sixty three). Field number information in ascending order is used to calculate and display the program playing time on LED display means 22 in FIG. 1. If the length of program material is known, field number information can be used to compute the remaining program playing time. For NTSC type signals, elapsed program time in minutes may be obtained by calculating the field number divided by 3600. If desired, the remaining program time may be derived from the previous calculation. This feature is useful to the viewer when scanning for a desired point in the program. A particularly useful feature, derived from field number information, is locked grooved correction which will be discussed hereinafter in conjunction with the more general case, track error correction.

Field numbers represent actual stylus position. Thus, whenever the stylus re-enters a groove, whether after jumping tracks or after the scan mechanism is operated, the actual stylus position can be determined from the first valid field number read. Both the track error correction system and the program playing time display means use field number data, and therefore share the decoding portion of the video disc digital data system. The particular embodiment of track error correction system discussed herein after uses field number data (stylus position) to keep the stylus at or ahead of its expected position assuming a predetermined stylus/record relative velocity. The program playing time display uses field number data for an indication of playing time, which is actually another representation of stylus position.

The microprocessor controller has several internal modes. FIG. 10 is a state transition diagram indicating the mode logic performed by the microprocessor program. Each of the circles represent a machine mode: LOAD, SPINUP, ACQUIRE, PLAY, PAUSE, PAUSE LATCHED, and END. For each mode, the position of the stylus and the status of the display is indicated inside each respective circle. The arrows between modes indicate the logical combination of signals, supplied by the panel controls (load, pause, scan), that cause a transition from one mode to another. The load signal indicates that the player mechanism is in a condition to receive a video disc. The pause signal is derived from a corresponding control panel switch, and the scan signal indicates the operation of the scan mechanism.

After power is turned on, the system goes into LOAD mode. A video disc may be loaded onto the turntable in this mode. After loading, the player enters SPINUP mode for several seconds, allowing the turntable to be brought up to the full speed of 450 RPM. At the end of SPINUP mode, the ACQUIRE mode is entered.

In ACQUIRE mode, the digital subsystem lowers the stylus and continuously searches for a "good read". In ACQUIRE mode, a "good read" is defined as a valid start code and a valid error check remainder. After finding a "good read" the system enters PLAY mode.

In PLAY mode, the microprocessor establishes in memory an expected, or predicted field number. The predicted field number is incremented or updated each field. For all subsequent reads, the microprocessor uses the predicted field number in performing two additional checks to further improve the integrity of the data.

The first additional check is a sector check. The video disc in the embodiment under consideration contains eight fields in every revolution, dividing the disc into eight sectors. Since the relative physical position of the sectors is fixed, the sectors follow a periodic recurring order as the disc rotates, even if the stylus jumps over a number of grooves. Although the digital information cannot be read for one or more fields, (sectors) while the stylus is skipping to a new groove, the microprocessor keeps time, and increments the predicted field number accordingly. When the stylus settles in a new groove and picks up a new digital message, the new field number is checked by comparison to the predicted field number. If the sector is wrong, the data is considered a "bad read" and the system generates a control or error signal to inhibit the use of the particular field number in the system.

Field number is represented by an 18 bit binary number. Sector information may be obtained from field number by finding the remainder after dividing the field number by eight. However, it is noted that the three least significant bits of a binary number counts modulo eight. Therefore the least significant three bits of each new field number must equal the least significant three bits of the predicted field number to pass the sector check.

A second check of data integrity is the range check, a test of the maximum range of stylus movement along the radius of the disc. No more than 63 grooves are expected to be jumped when encountering worst case conditions in any mode. Groove numbers are represented by the most significant 15 bits of the field number. The microprocessor subtracts the present groove number from the predicted groove number. If the difference is greater than the acceptable range of 63 grooves, then the present data is considered a "bad read". All other reads are regarded as good reads and are used to update the predicted field number. After fifteen consecutive bad reads, the system re-enters the ACQUIRE mode. The presence of a scan signal in certain modes, as shown in FIG. 10, will also cause a transition to ACQUIRE mode.

When going from ACQUIRE mode to PLAY mode the microprocessor sets the bad read count to thirteen. This means that when entering PLAY mode from ACQUIRE mode, one of the next two fields must supply a good read or the bad read count will reach fifteen causing a return to ACQUIRE mode.

If the pause button is pressed during PLAY mode, the system enters PAUSE mode. In this mode the stylus is off the record and is held in its then radial position over the record. When the pause button is released, PAUSE LATCHED mode is entered and held. Pressing the pause button again releases the PAUSE LATCHED mode, causing a transition to ACQUIRE mode. END mode is entered from PLAY mode when band number sixty three is detected.

FIG. 11 is a flow chart of the program executed by the microprocessor. The microprocessor hardware includes one interrupt line and a programmable timer. A commercially available microprocessor suitable for the present system is the Fairchild Semiconductor model F8.

The microprocessor uses the timer to control the window in time that the information buffer searches for data. This "data window" is approximately twelve horizontal lines wide and is centered about the expected data. When no data is found, the timer maintains internal program synchronization to one field time interval.

The microprocessor interrupt is coupled to the status signal on conductor 75 (FIG. 4). Interrupts are enabled only in ACQUIRE mode when the system continuously searches for data. The program is interrupted when a digital message is received. The interrupt service routine (not shown) sets an interrupt flag if the error code check indicates validity. Thereafter, in PLAY mode, the programmable timer is used to indicate the estimated time of arrival of the next digital message.

Switch inputs (load, scan, and pause) are conditioned to prevent switch bounce from causing undesired player response. The microprocessor program includes logic to debounce switch inputs. Debounced switch values are stored in memory. A separate debounce count is maintained for each switch. To check debounce 154 the switches are sampled and compared to the stored switch value. If the sampled state and the stored state are the same, the debounce count for that switch is set to zero. Switch states are sampled as often as possible. Each field, (every 16 milliseconds for NTSC), all debounce counts are incremented unconditionally. If the resulting debounce count is equal to or greater than 2, the stored state is updated to the new (debounced) value. The new switch state is then acted upon.

The first programmed step (FIG. 11), after power is turned on, is initialization 150 of all program parameters. The timer is set to time out one video field. Mode is set to LOAD.

The next step 152 is a program to carry out the state transition logic represented in FIG. 10. Debounce counts are normally incremented at this time, and tested to determine whether a new switch state is fully debounced.

After the mode selection logic 152, the program enters a tight loop 153 to (1) sample switches setting debounce counts to zero, if required 154, and (2) check if the timer is close to time out 155, and (3) check if the interrupt flag has been set 156.

If the interrupt flag is set 156, the program transfers data, 157a, from the information buffer and sets the timer, 157b, to time out a new field interval. When the interrupt service routine sets the interrupt flag, the contents of the timer are saved in memory. The program now uses the previously stored timer contents to set the timer, 157b, with a corrected value predicting the approximate time of occurrence of the next digital message. As previously noted, even though the data represents the first good read in ACQUIRE mode, the bad read count is set, 157c, to 13.

If the interrupt flag is not set, the program branches as the timer gets close to time out, 155. If the machine is not in PLAY mode 159, then the timer is set to time out another field interval, 158. If the machine is in PLAY mode, 159, then a number of time critical tasks, 160, are performed. The data window is opened, 160a, (by setting control signal on conductor 71 in FIGS. 4 and 8 to a logical one) approximately six horizontal lines before the expected data. Received data is read and checked as previously described. After data is received, or if no data is received, the data window is closed. Timer content, which represents the actual time of arrival of the digital message, is used as a correction factor to set the timer again, 160b. The timer is therefore set to center the next data window over the predicted time of arrival of the next digital message based on the actual time of arrival of the present digital message.

Expected field number is updated, 160c, band number is checked for start (band 0) and end of play (band sixty three), and the bad read count is incremented, 160g, for a bad read. For valid field data in the program viewing material, time is calculated and displayed, 160f. If valid field data indicates that the stylus has skipped backward, the stylus kicker means is activated, 160e, and ACQUIRE mode is entered. Also, if the bad read count reaches 15, ACQUIRE mode is directly entered. Throughout the time utilized for critical tasks 160, the switch debounce check routine is repeated periodically so that switches are tested as often as is feasible. The program unconditionally returns through the mode selection logic 152 to the tight loop 153 and waits for the timer test 155, or the interrupt check 156, to indicate the arrival of the next digital message.

The timer may be set by loading the timer directly via programmed instructions. However, rather than use a sequence of instructions, it is best to "set" the timer by establishing a location in memory (a mark) which corresponds to a time out condition of the timer. The timer, then, is free running. Time out, or closeness to the time out, is detected by comparing the contents of the timer to the mark set in memory. The next desired time out condition is set by adding the next desired time interval to the previous timer contents and storing the result in memory. The timer is thus "set" each time valid data is received, or if no data is received within the data window, by setting a new mark in memory corresponding to the next time out condition.

The programmable timer in the microprocessor used in the present embodiment is conditioned by the program to divide cycles of the input 1.53 MHz clock by a factor of 200. The timer thus counts once for every 200 cycles of the 1.53 MHz clock. One vertical field (1/60 second for NTSC) is then approximately 128 timer counts. One may alternatively use a timer which counts a different multiple of the 1.53 MHz clock, or one that uses a timing source independent of the video signal.

The data window is made wide enough to allow for several sources of timing error. Timer uncertainty due to the finite resolution of the timer is equal to one least significant bit, which corresponds to two horizontal lines. Accumulated drift error, because 128 timer counts is not exactly one vertical field, is somewhat less than one line after 16 consecutive fields in which no valid message is found. It is noted that since the 1.53 MHz color subcarrier clock is an odd multiple of one half the line frequency, a timer which counts a corresponding multiple of the color subcarrier clock would have zero drift rate. In the particular embodiment described herein, program uncertainty in determining the time of arrival of the data, is approximately 97 microseconds, or about 1.5 lines. Finally, because alternate fields are interlaced, the time from one digital message to the next is either 262 lines or 263 lines, depending on whether the present field is odd or even. Although the program could keep track of odd and even fields, it is simpler to just widen the data window by one additional line. Combining the above factors, it can be shown that a data window extending three timer counts (about 6 lines) both before and after the start of expected data is adequate to allow for worst case timing conditions.

TRACK ERROR CORRECTION

As mentioned earlier, field number information may be used to detect locked grooves. If the new field number (after sector and range check) is less than the expected field number, then the stylus has skipped backward and is repeating the tracking of a previously played convolution(s), i.e. a locked groove has been encountered. If the new field number is greater than the expected field number, the stylus has skipped forward, i.e. toward record center. In the present application, skipped grooves are ignored; if the new field number is greater (but still passes sector and range check) then the expected field is updated to the new field. In certain other applications, such as where the video disc is used to record digital information on many horizontal lines, it may be necessary to detect and correct skipped grooves as well. However, for the present video application, a locked groove is corrected by operating a stylus "kicker" until the stylus is returned to the expected track. Eventually, the stylus will be advanced past the locked groove defect.

In a more general sense, the use of the field number information in accordance with the present disclosure provides an accurate means for detecting general tracking errors. In any video disc system having spiral or circular tracks, including optical and grooveless systems, tracking errors due to defects and contaminants are always possible. The present system provides a means for detecting and correcting such tracking errors in a video disc player. For positive tracking, a bi-directional kicker means is provided for moving the pickup backward or forward in the program material. Thus, when a tracking error is detected, whether a skipped track or a locked track, the pickup is moved in such direction so as to correct the tracking error. Although the regular pickup servo could be used for track error correction purposes, a separate kicker, or pickup repositioning means, is preferable. The regular servo is generally adapted for stable tracking of the spiral signal track, and may not have the proper characteristics to respond to abrupt tracking errors. A separate kicker, on the other hand, can be specifically adapted to provide the fast response needed to correct tracking errors. A specific example of a kicker suitable for use with the disclosed apparatus may be found in U.S. patent application Ser. No. 39,358, for E. Simshauser entitled "TRACK SKIPPER APPARATUS FOR VIDEO DISC PLAYER", filed May 15, 1979 and assigned to the assignee of the present invention.

Several control algorithms are possible. The pickup apparatus may be returned directly to the correct track by producing stylus motion proportional to the magnitude of the detected tracking error. Or, a kicker may be operated in response to a series of pulses, wherein the number of pulses is proportional to the magnitude of the detected tracking error. The pickup is moved a given number of tracks per pulse until the stylus is back on the expected track. For certain applications (e.g. retrieving digital data stored on the video disc medium) it may be desirable to return the pickup to the point of departure and attempt a second read, rather than return the pickup to the expected track. In any event, it is seen that by the use of a kicker and suitable control logic, successful tracking can be obtained even though the video disc contains defects or contaminants which would otherwise cause unacceptable tracking errors.

In a digital track correction system, security against undetected data errors is particularly important to prevent noisy signals from advancing or retarding the pickup unnecessarily. The present data system reduces the probability of an undetected read error to a negligible level.

To a rough approximation, one can estimate the probability that a random digital input will appear to the data system as a valid message containing a non-sequential field number, thereby actuating the stylus kicker. The random probability of a good start code is 1 in $2^{13}$. The random probability of a good error code is also 1 in $2^{13}$. The random probability of a good field number is calculated as follows. Field numbers contain 18 bits. Since there are eight sectors on the disc of the system under consideration, the least significant 3 bits of each field number indicate the sector number, which must match the expected sector number. The remaining fifteen bits, which represent groove number, can vary over the allowable range (plus or minus 63 grooves). Therefore only 126 out of $2^{18}$ random field numbers will pass the sector and range checks. Combining all safeguards, the probability of an undetected error is 126 in $2^{44}$.

The above estimate is based on an assumption of a truly random input, and it does not take into account several factors which further reduce the probability of an undetected error.

For example, on a video disc track, burst noise, where the erroneous bits are adjacent to each other, is more likely than other types of noise. As previously noted, the particular error code chosen detects all single burst errors up to 13 bits, and a high percentage of all longer bursts as well. Also, as previously explained, the choice of a non-zero remainder for the error check code (a coset code) further reduces the probability of an undetected error. Furthermore, the particular start code chosen, a Barker code, reduces the probability that noise will cause a false start code detection.

This disclosed data system, as applied to the video disc system, results in a rate of undetected errors which is relatively low and false alarms which would otherwise cause unnecessary stylus movement are significantly reduced. The data security provided by the disclosed system improves the stability of many player functions, such as display of program playing time, which depend on recorded digital data for proper operation.

What is claimed is:

1. In a video disc player for playing a sectored video disc having a spiral information track on the surface thereof, said spiral information track containing elements representing a recorded carrier modulated with a video signal, said video signal comprising fields of video information, each of said fields of video information including an information signal on one horizontal line thereof, said information signal representing a consecutively ordered digital field number corresponding to the respective video field containing said information signal, said video signal including a fixed number of video fields per spiral convolution such that each of said field numbers includes sector information, said video disc player including a pickup apparatus for sensing said recorded video signal and means for detecting said field numbers, an apparatus for correlating successive values of said detected field numbers to a previously detected field number comprising:
   means for storing successive ones of said detected field numbers;
   means for counting a prescribed number of video fields elapsed after storing each one of said detected field numbers;
   means for incrementing said stored field number by said number of elapsed fields counted thereby generating a predicted field number equal to said previously stored field number plus said counted prescribed number of elapsed video fields;
   means for dividing a successively detected field number and said predicted field number by said fixed number of video fields per convolution to generate respective quotients and remainders after division; and
   means for comparing respective remainders after division of said detected field number and said predicted field number, and generating a signal at an output terminal thereof whenever the respective remainder are equal.

2. The apparatus set forth in claim 1 further including:
   means for comparing a successively detected field number to said predicted field number and producing an output signal at an output terminal thereof whenever said detected field number is within a predetermined acceptable range of said predicted field number, said output signal providing an indication of the validity of the successively detected field number.

3. In a video disc player for playing a sectored video disc having a spiral information track on the surface thereof, said spiral information track containing elements representing a recorded carrier signal modulated with a video signal, said video signal comprising fields of video information, each of said fields of video information including an information signal on one horizontal line thereof, said information signal representing a consecutively ordered digital field number corresponding to the respective video field containing said information signal, said video signal including a fixed number of video fields per spiral convolution such that each of said field numbers is related to a corresponding sector of said video disc, said video disc player including a pickup apparatus for sensing said recorded video signal and
   means for counting a prescribed number of video fields elapsed after storing each one of said detected field numbers;

means for incrementing said stored field number by said number of elapsed fields counted thereby generating a predicted field number equal to said previously stored field number plus said counted prescribed number of elapsed video fields comprising:

means for successively storing successive ones of said detected field numbers;

means for generating a predicted field number by incrementing said stored field number for each video field; and means for comparing the least significant three bits of said detected field number to respective ones of the least significant three bits of said predicted field number and producing an output signal at an output terminal thereof whenever the respective sector information of said detected field number and said predicted field number correlates to the same sector of said video disc.

4. In a video disc player for playing a sectored video disc having a spiral information track on the surface thereof, said spiral information track containing elements representing a recorded carrier signal modulated with a video signal, said video signal comprising fields of information, each of said fields of video information including an information signal on one horizontal line thereof, said information signal representing a consecutively ordered digital field number corresponding to the respective video field containing said information signal, said video signal including a fixed number of video fields per spiral convolution, said video disc player including a pickup apparatus for sensing said recorded video signal and means for detecting said field numbers, an apparatus for correlating successive values of said detected field numbers to a previously detected field number and thereby determining the validity of the detected field number, said apparatus comprising:

means for storing successive ones of said detected field numbers;

means for counting a prescribed number of video fields elapsed after storing each one of said detected field numbers;

means for incrementing said detected field numbers by the elapsed number of fields counted to generate a predicted field number equal to said previously stored field number plus said prescribed number of elapsed video fields; and means for comparing successively detected field numbers with successive predicted field numbers and producing a signal at an output terminal thereof whenever said successively detected field number is within a predetermined acceptable range of said predicted field number.

5. In a video disc player for playing a sectored video disc having a spiral information track on the surface thereof, said spiral information track containing elements representing a recorded carrier signal modulated with a video signal, said video signal comprising fields of information, each of said fields of video information including an information signal on one horizontal line thereof, said information signal representing a consecutively ordered digital field number corresponding to the respective video field containing said information signal, said video signal including a fixed number of video fields per spiral convolution, such that each of said field numbers provides sector information, said video disc player including a pickup apparatus for sensing said recorded video signal and means for detecting said field numbers, an apparatus for correlating successive values of said detected field numbers to a previously detected field number, said apparatus comprising:

means for storing successive ones of said detected field numbers;

means for counting a prescribed number of video fields elapsed after storing each one of said detected field numbers, said counting means including means for generating a predicted filed number equal to said previously stored field number plus said counted prescribed number of elapsed video fields;

first means for comparing a successively detected field number to said predicted field number and producing a signal at an output terminal thereof whenever the respective sector information of said detected field number and said predicted field number correlate to the same sector of said video disc; and second means for comparing a successively detected field number and said predicted field number and providing a signal at an output terminal thereof when the difference between the successively detected field number and said predicted field number is within a predetermined acceptable range.

6. An apparatus according to claim 5 for correlating successive values of detected field numbers wherein said video disc contains eight sectors per spiral convolution and said field numbers are represented in binary form, said first means for comparing a successively detected field number to said predicted field number providing an output signal when the least significant three bits of said detected field number is equal to the least significant three bits of said predicted field number.

* * * * *

UNITED STATES PATENT AND TRADEMARK OFFICE
CERTIFICATE OF CORRECTION

PATENT NO. : 4,307,418

DATED : December 22, 1981

INVENTOR(S) : Michael Jordan Mindel et al.

It is certified that error appears in the above-identified patent and that said Letters Patent is hereby corrected as shown below:

Col. 1. line 17, "field" should be --filed--.

Col. 17, line 37, "fiften" should be --fifteen--.

Claim 3 errors occur at Col. 18, lines 65-68; Col. 19, lines 8-10. Claim 3 should read as follows:

3. In a video disc player for playing a sectored video disc having a spiral information track on the surface thereof, said spiral information track containing elements representing a recorded carrier signal modulated with a video signal, said video signal comprising fields of video information, each of said fields of video information including an information signal on one horizontal line thereof, said information signal representing a consecutively ordered digital field number corresponding to the respective video field containing said information signal, said video signal including a fixed number of video fields per spiral convolution such that each of said field numbers is related to a corresponding sector of said video disc, said video disc player including a pickup apparatus for sensing said recorded video signal and means for detecting said field numbers, an apparatus for correlating successive values of said detected field numbers to a previously detected field number, said apparatus comprising:

UNITED STATES PATENT AND TRADEMARK OFFICE
CERTIFICATE OF CORRECTION

PATENT NO. : 4,307,418

DATED : December 22, 1981

INVENTOR(S) : Michael Jordan Mindel et al.

It is certified that error appears in the above-identified patent and that said Letters Patent is hereby corrected as shown below:

means for successively storing successive ones of said detected field numbers;

means for counting a prescribed number of video fields elapsed after storing each one of said detected field numbers;

means for incrementing said stored field number by said number of elapsed fields counted thereby generating a predicted field number equal to said previously stored field number plus said counted prescribed number of elapsed video fields;

means for comparing the least significant three bits of said detected field number to respective ones of the least significant three bits of said predicted field number and producing an output signal at an output terminal thereof whenever the respective sector information of said detected field number and said predicted field number correlates to the same sector of said video disc.

Signed and Sealed this

Fifteenth Day of June 1982

[SEAL]

Attest:

GERALD J. MOSSINGHOFF

Attesting Officer

Commissioner of Patents and Trademarks